US011763661B1

(12) United States Patent
Flores-Gonzalez et al.

(10) Patent No.: US 11,763,661 B1
(45) Date of Patent: Sep. 19, 2023

(54) VEHICULAR CHILD OR PET SAFETY DEVICE

(71) Applicants: Arturo Eugenio Flores-Gonzalez, Howe, TX (US); Hongtai Li, Springfield, MO (US)

(72) Inventors: Arturo Eugenio Flores-Gonzalez, Howe, TX (US); Hongtai Li, Springfield, MO (US)

( * ) Notice: Subject to any disclaimer, the term of this patent is extended or adjusted under 35 U.S.C. 154(b) by 0 days.

(21) Appl. No.: 17/729,798

(22) Filed: Apr. 26, 2022

Related U.S. Application Data

(60) Provisional application No. 63/179,834, filed on Apr. 26, 2021.

(51) Int. Cl.
*G08B 23/00* (2006.01)
*G08B 21/24* (2006.01)
*B60Q 9/00* (2006.01)
*B60R 16/03* (2006.01)
*H04R 1/02* (2006.01)
*G06F 3/16* (2006.01)
*G08B 3/10* (2006.01)

(52) U.S. Cl.
CPC ............. *G08B 21/24* (2013.01); *B60Q 9/00* (2013.01); *B60R 16/03* (2013.01); *G06F 3/165* (2013.01); *G06F 3/167* (2013.01); *G08B 3/10* (2013.01); *H04R 1/028* (2013.01); *H04R 2499/13* (2013.01)

(58) Field of Classification Search
CPC .. G08B 21/24; G08B 3/10; B60Q 9/00; B60R 16/03; G06F 3/165; G06F 3/167; H04R 1/028; H04R 2499/13
USPC ....................................... 340/573.1
See application file for complete search history.

(56) References Cited

U.S. PATENT DOCUMENTS

| | | | | |
|---|---|---|---|---|
| 9,676,325 B1* | 6/2017 | Duan | ...................... | G08B 21/24 |
| 9,741,224 B1* | 8/2017 | Singh | .................... | H04B 1/3816 |
| 10,438,479 B1* | 10/2019 | Guidotti | ................... | B60Q 1/50 |
| 11,230,246 B1* | 1/2022 | Beach | ................... | B60W 40/08 |
| 2009/0027188 A1* | 1/2009 | Saban | .................... | B60N 2/002 |
| | | | | 340/439 |
| 2011/0285524 A1* | 11/2011 | Qian | ................. | B60R 21/01556 |
| | | | | 340/457 |
| 2013/0033214 A1* | 2/2013 | Obata | ................ | G01R 31/1227 |
| | | | | 324/765.01 |
| 2022/0118941 A1* | 4/2022 | Neubecker | ........... | G06V 20/593 |

* cited by examiner

*Primary Examiner* — Naomi J Small
(74) *Attorney, Agent, or Firm* — John Wilson Jones; Jones Delflache LLP

(57) ABSTRACT

A vehicular safety device for monitoring the presence of a child or pet in a motorized vehicle. The device interfaces with the vehicle's power receptacle for detection of the on/off state of the vehicle. The operator is prompted to inform the device of the presence of the child or pet upon start of the engine of the vehicle through an auditory interface. When the engine of the vehicle is shut down, the device provides an audible reminder to the operator that a child or pet is present in the vehicle.

20 Claims, 12 Drawing Sheets

VEHICULAR CHILD OR PET SAFETY DEVICE

This application claims the benefit of U.S. patent application Ser. No. 63/179,834, filed on Apr. 26, 2021 which is herein incorporated by reference.

FIELD OF THE DISCLOSURE

The invention relates to a device and method for reminding occupants in a vehicle that there is a child or a pet in the vehicle when the vehicle arrives to its destination and the engine has been turned off. The device is inexpensive, easily installed in any vehicle and transferable to any vehicle.

BACKGROUND OF THE DISCLOSURE

Every year children and pets are killed or injured from hypothermia because they were left in an unattended vehicle. Vehicles exposed to full sun in the summer months experience extremely rapid rises of interior temperatures. For example, when the outside temperature is 93° F., the inside temperature of a vehicle can reach 125° F. in as little as 20 minutes and at 40 minutes, the inside temperature can be 140° F. Such high heat rapidly overwhelms the body's ability to regulate temperature. In a closed environment, the body can go into shock and circulation to vital organs will begin to fail.

Such high temperatures affect infants and small children disproportionately. Not surprisingly, the number of child and pet deaths in the United States from hyperthermia continues to rise. Most of these occur because the driver of the vehicle simply "forgot" to remove the child or pet from the vehicle after turning the ignition off. Even if there is no injury to child or pet, caregivers and owners who leave either their child or pet in a vehicle unattended can be cited by police and possibly have the child or pet taken away from them.

Accordingly, there is a need for a simple, easy to use, inexpensive easily installed reminder system to prevent fatalities or injuries to a child or pet in a vehicle.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment, a vehicular child or pet safety device is provided having (a) a power detection module capable of detecting the start or running of an engine in a motorized vehicle; (b) a first voice memory module capable of providing a query to the operator of the motorized vehicle if a child or pet is in the motorized vehicle; (c) a pulse inverter module for capable of detecting stopping of the engine; (d) a second memory module capable of providing to the operator a reminder message of the presence of a child or pet in the motorized vehicle; (e) a battery module capable of providing power to the safety device; and (f) at least one speaker capable of providing an audio interface to the operator.

In another embodiment, a vehicular child or pet safety device is provided having the modules of the above paragraph within a casing and having one or more power sources for connecting it to a power source receptacle within the motorized vehicle.

In another embodiment, a vehicular child or pet safety device is provided having the modules of the preceding paragraphs and within a casing, the casing having an alert indicator for notifying the first voice memory module of a child or pet in the motorized vehicle, an indicator light capable of notifying the operator of the motorized vehicle of connection with the engine of the motorized vehicle and one or more speakers.

In still another embodiment is provided a method for notifying an operator of a motorized vehicle of a child or pet in a motorized vehicle after the engine of the motorized vehicle has been shut down. In this method, a vehicular child or pet safety device is installed in a motorized vehicle; a (first) auditory memory module notifies the operator of the motorized vehicle, once the engine has started, of the child or pet within the motorized vehicle; and a second memory module notifies the operator of the motorized vehicle of the child or pet being in the motorized vehicle once the engine is turned off.

Accordingly, the present disclosure includes features and advantages which are believed to enable it to advance downhole tool technology. Characteristics and advantages of the present disclosure described above and additional features and benefits will be readily apparent to those skilled in the art upon consideration of the following detailed description of various embodiments and referring to the accompanying drawings.

DRAWINGS

The following figures are part of the present specification, included to demonstrate certain aspects of various embodiments of this disclosure and referenced in the detailed description herein:

FIGS. 10(A), 10(B), 10(C) and 10(D) represent different views of an alternative vehicular device.

Figure 10B:
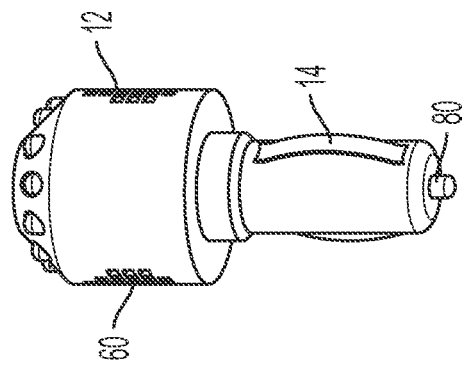
Figure 10D:
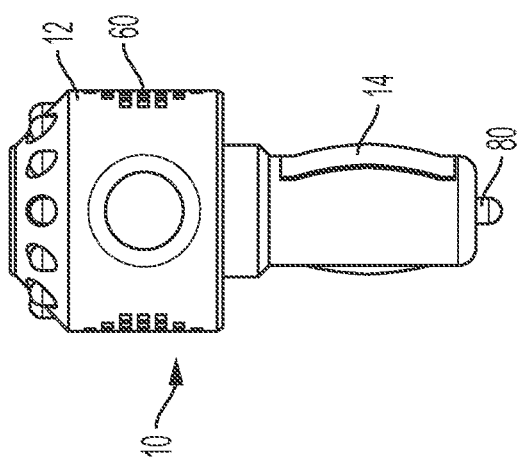
Figure 10A:
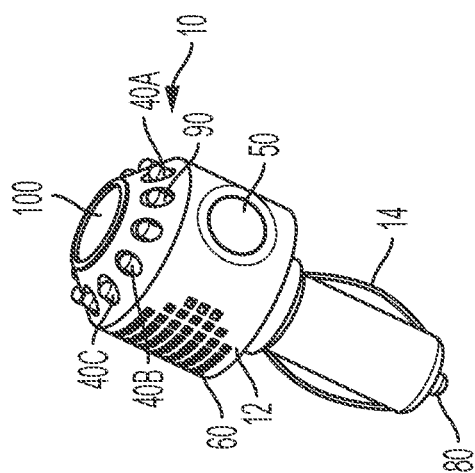
Figure 10C:
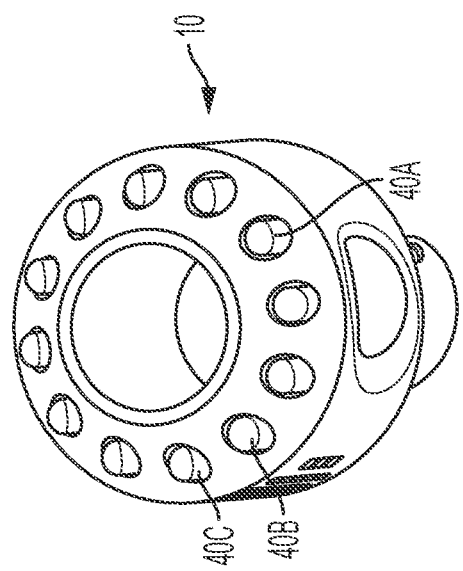
Figure 11:
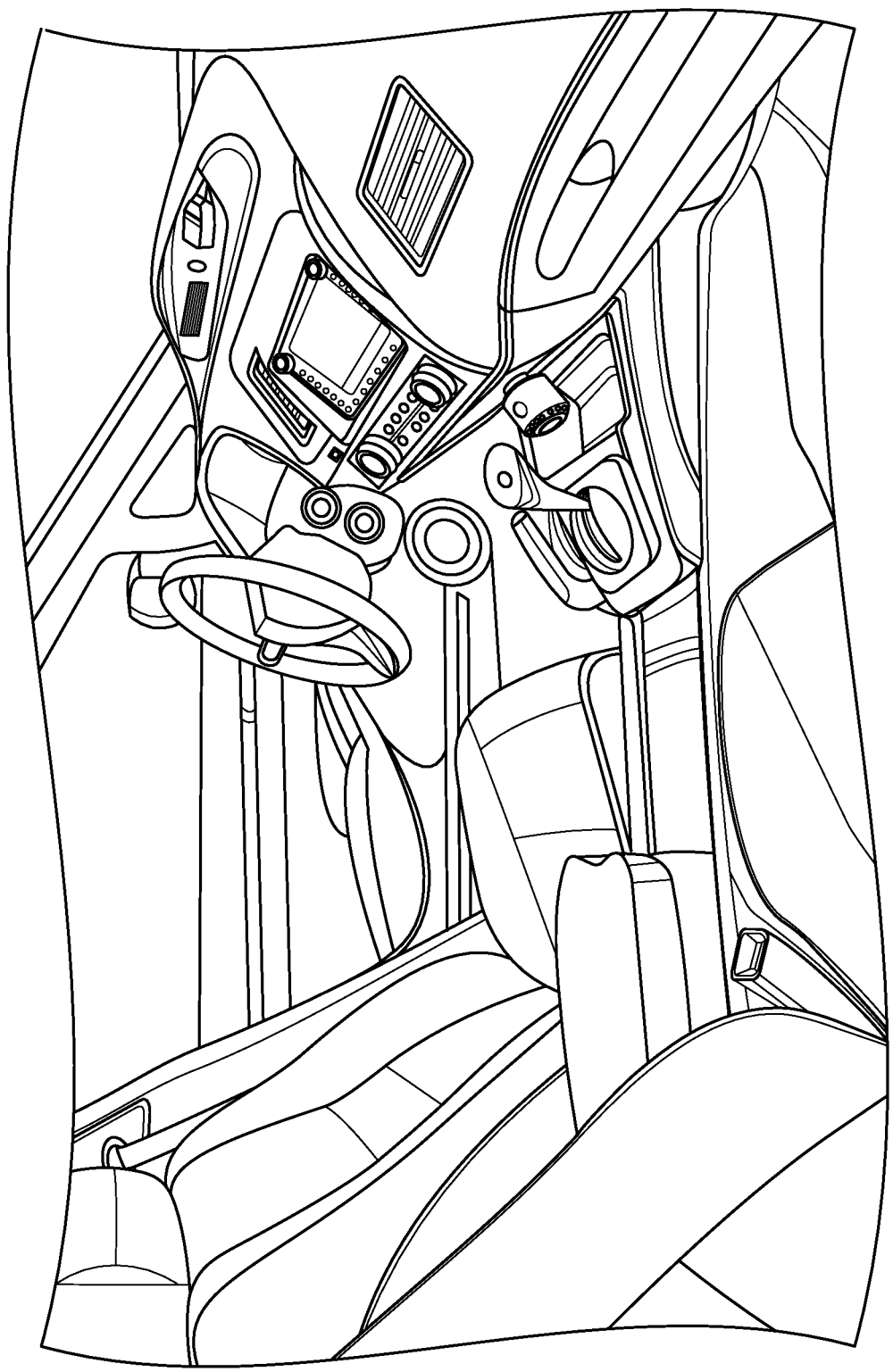

FIG. 11 demonstrates an exemplary illustration of how the vehicular device of FIGS. 10(A), 10(B), 10(C) and 10(D) may be attached to the power source receptacle of a vehicle.

Figure 12A:
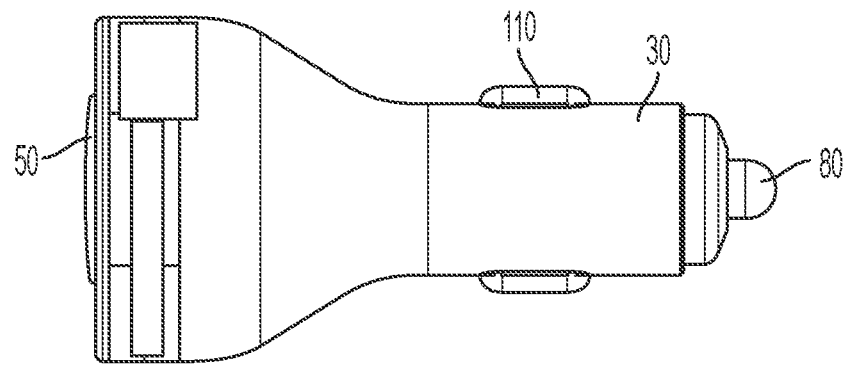
Figure 12B:
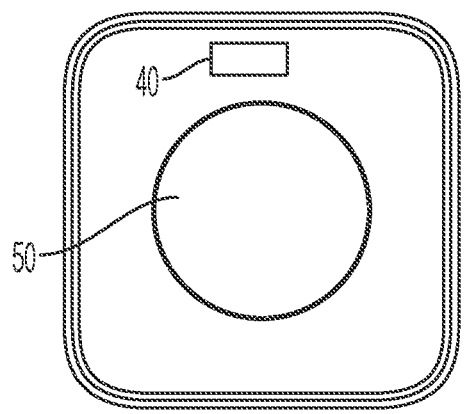
Figure 12C:
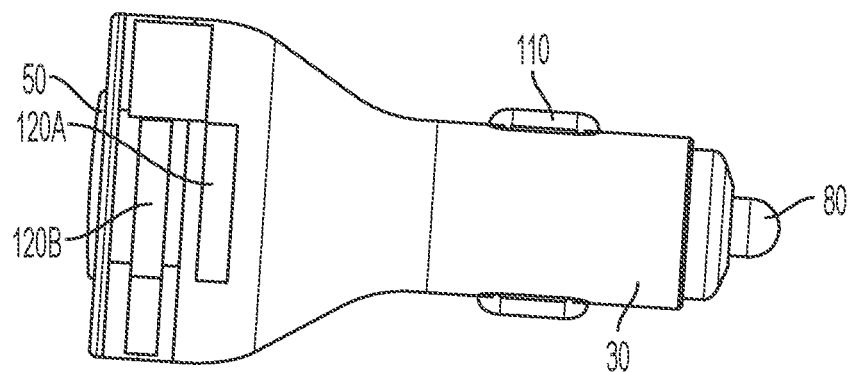

FIGS. 12(A), 12(B) and 12(C) represent different views of an alternative vehicular device.

DETAILED DESCRIPTION

The following description provides specific details, such as material types, compositions, and processing conditions in order to provide a thorough description of embodiments of the disclosure. However, a person of ordinary skill in the art will understand that the embodiments of the disclosure may be practiced without employing these specific details. Only those process acts and structures necessary to understand the embodiments of the disclosure are described in detail below.

While exemplary embodiments have been shown and described, variations, modifications and/or changes of the system, apparatus and methods, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

Characteristics and advantages of the present disclosure and additional features and benefits will be readily apparent to those skilled in the art upon consideration of the following detailed description of exemplary embodiments of the present disclosure and referring to the accompanying figures. The figures are not necessarily to scale and certain features and certain views of the figures may be shown exaggerated in scale or in schematic in the interest of clarity and conciseness.

It should be understood that the description herein and appended drawings, being of exemplary embodiments, is not intended to limit the claims. On the contrary, the intention is to cover all modifications, equivalents and alternatives falling within the spirit and scope of the claims. Changes may be made to the particular embodiments and details disclosed herein without departing from such spirit and scope.

The terms "connected", "engaged" and the like, and variations thereof, as used herein and in the appended claims are intended to mean either an indirect or direct connection or engagement. Thus, if a first element is attached to or engaged to a second element, that connection may be through a direct connection, or through an indirect connection via other elements and connections.

Certain terms are used herein and in the appended claims to refer to particular components. As one skilled in the art will appreciate, different persons may refer to a component by different names. This document does not intend to distinguish between components that differ in name but not function.

The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

The vehicular safety device described herein is used to remind occupants and operators of motorized vehicles that there is a child or pet present in the vehicle when the ignition has been turned off. The disclosure further is directed to a process to engage and use the device.

The device is designed to be easily installed as an aftermarket item and typically uses a power source receptacle in the vehicle to detect both (i) the running or start of the engine and (ii) stopping of the engine. Typically, the power source receptacle is a power socket in the vehicle (such as a cigarette lighter socket) or a USB receptor.

In operation, the device instructs the driver or occupant to press the blinking button if there is a child or pet present in the vehicle at the time the ignition is turned on. When the device detects that the ignition has been turned off, the device then provides an audible reminder that the child or pet is still present in the vehicle.

In one embodiment of the disclosure, the device contains an alert button, such as a colored button, preferably red, which must be pressed if there is a child or pet present in the vehicle at the time the ignition is turned on. The device is preferably first plugged into the vehicle's power source receptacle before the engine has been started. In this manner, once the device detects engine start, the device instructs the driver or occupant through the first memory module to press the alert button on the device if there is a child or pet present in the vehicle. If the alert button is pressed, an active indicator is preferably lit. The active indicator is typically a LED having a different color than the alert button. If desired, the alert button can be programmed to flash during use. When the device detects the engine being turned off, the device provides an audible reminder through the second voice memory module that a child or pet is present in the vehicle.

Figure 1:
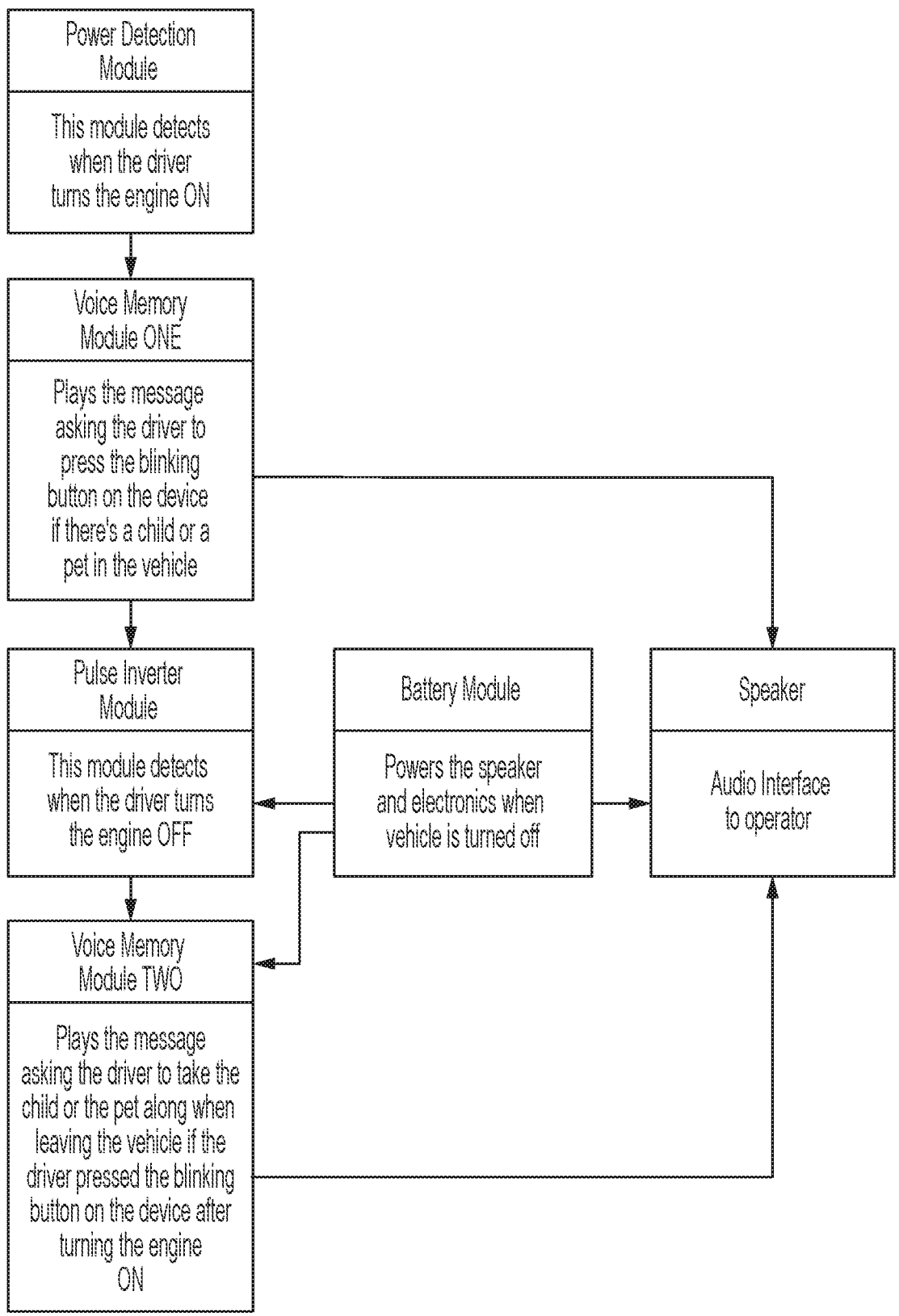
FIG. 1 is a flow chart of the different modules and the inter-relationships of the modules of the safety device.

The device has a casing for holding a power detection module, two voice memory modules, pulse inverter module and speaker. A battery module may also be present. The relationship of the various modules in the casing is represented in the block diagram of FIG. 1, the functions are of which are as follows:
  (i) the power detection module detects the start or running of the engine;
  (ii) the power detection module communicates with the first auditory memory module which provides the initial message asking the operator to notify the device if there is a child or pet in the vehicle. Typically, there is an alert button on the surface of the casing for the operator to press to notify the auditory memory module. An audible message is sent through an audio interface to the operator through one or more speakers;
  (iii) the first auditory memory module communicates with the pulse inverter module. The pulse inverter module detects engine stop;
  (iv) the pulse invert module communicates with the second voice memory module. The second auditory memory module provides the reminder message to the operator that there is a child or pet in the vehicle. The reminder message is sent by audio interface through the speaker module to the operator, typically when the engine is stopped;
  (v) the speaker module provides an audio interface to the operator and receives communication from the first memory module and the second memory module; and (vi) the battery module provides power to the speaker(s), power detection module, first memory module, pulse inverter module, second memory module power detection module.

Figure 3:
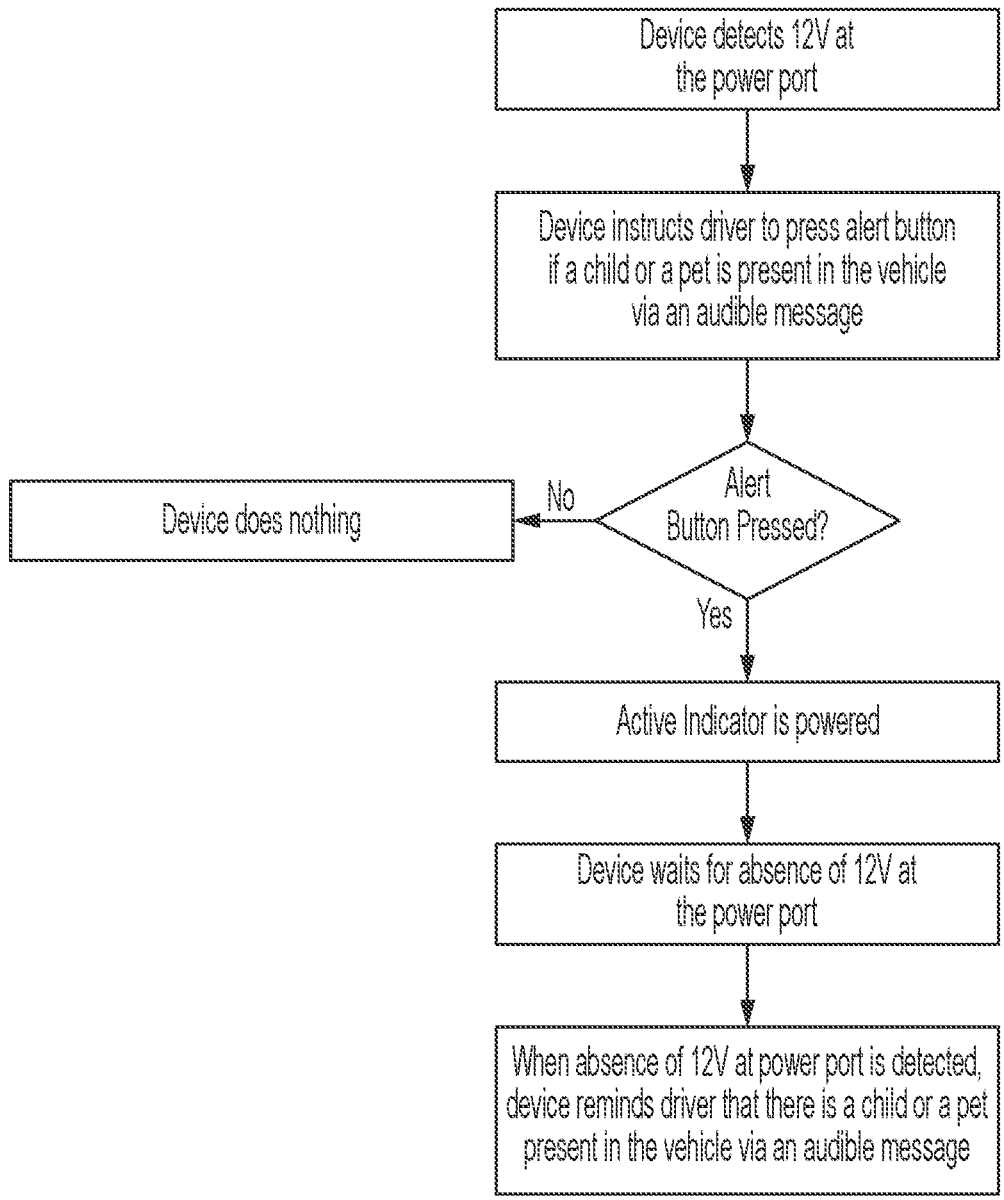
FIG. 3 is a flow chart of the process by which the safety device is used to remind the operator that a child or pet is present in the vehicle.

The flow chart of FIG. 3 represents an exemplary process by which the device is used to remind the driver that a child is present in the vehicle. Once the device is detected by the power detection module, the operator of the vehicle is instructed (typically in an audible message) to notify the power detection module of the presence of the child or pet in the vehicle. (In an embodiment, the first voice memory module may be modified by the operator to act in conjunction with a voice communicator. As such, different commands may be provided to the operator from the first voice memory module. A factory command may further be edited by the operator by linking a voice communicator to the first voice memory module.) The operator may send a trigger to the first voice memory module that a child or pet is in the vehicle by pressing an alert (or notification) button on the casing. The alert button communicates with the voice memory module. If the alert button is not pressed, no communication results between the operator and the voice memory module and the vehicular device shuts down. If the alert button is pressed, notification is sent to the voice memory module of the presence of the child or pet in the vehicle. The operator is preferably reminded of the presence of the child or pet by an indicator light. When the engine is shut down, the pulse inverter module detects the powering down of the engine and stops functioning at the power port. As shown in FIG. 3, the device may be inserted into a high voltage (for example, 12 volt) port. Thus, when the pulse inverter module recognizes the absence of the voltage at the power port, the operator is reminded by the second memory module that the child or pet is present in the vehicle. Typically, the reminder is an audible message.

The device is inexpensive, easily installed in any vehicle and transferable between vehicles. The device complies with UL Standard 2089 "Vehicle Battery Adapters" so that it does not compromise the electronics of the vehicle.

Figure 2:
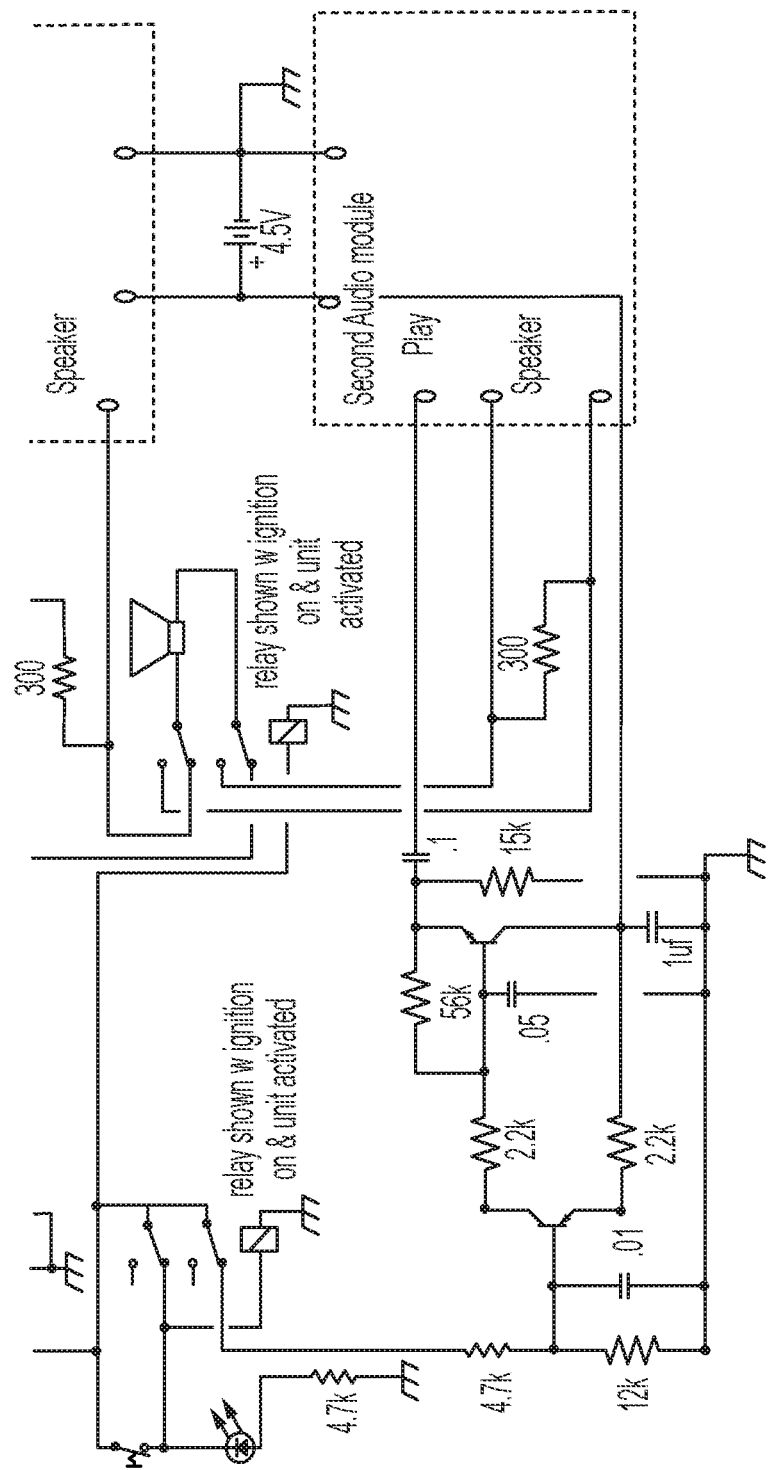
FIG. 2 is a schematic of an operating circuit for the different modules of the safety device.
Figure 4:
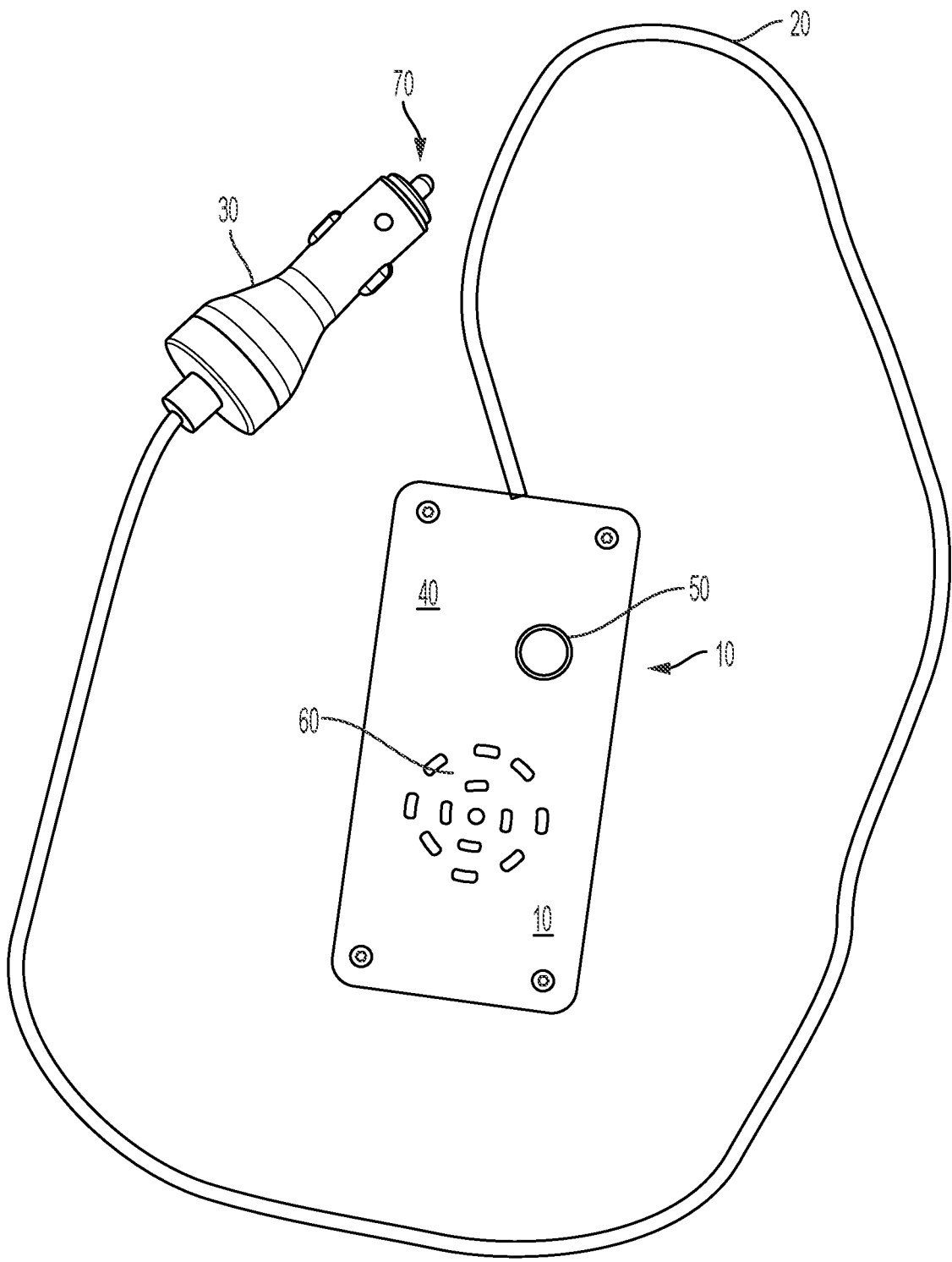
FIG. 4 is an embodiment of a vehicular device as disclosed herein.

An exemplary embodiment of the device is illustrated in FIG. 4, wherein casing 10 is connected by flexible wire cable 20 to power connector 30 into the power source of the vehicle using male prong 70. As shown, power connector 30 may be an ordinary adapter for insertion into a power source receptacle (such as a cigarette socket) in the vehicle. Adapters include those which comply with UL Standard 2089 which may be purchased in retail outlets. Casing 10 is shown as having active power indicator 40, alert button 50 and speaker grill 60. An exemplary operating circuit for the device of FIG. 4 is shown in FIG. 2. FIG. 2 shows the interplay between different modules of the safety device. As illustrated, power detection module is represented by circuit 300 which interacts with the first voice memory module. The pulse inverter module acting in conjunction with the second voice memory module is shown by the left section of the drawing.

Figure 5:
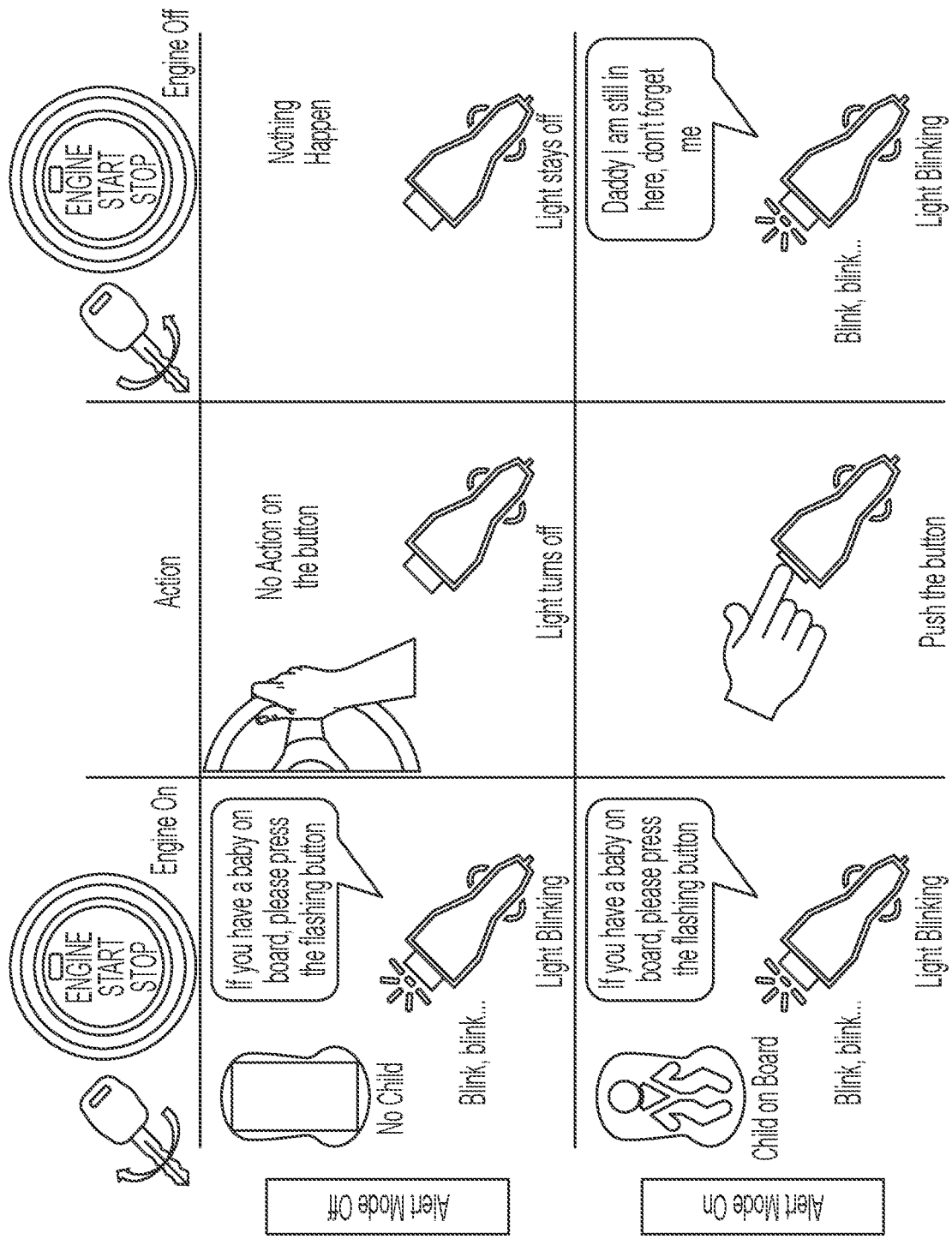
FIG. 5 illustrates the commands received by the operator and the visuals observed by the operator when the vehicular device having a power connector as shown in FIG. 4 is connected to the power source receptor of the vehicle.

FIG. 5 illustrates the commands received by the operator and the visuals observed by the operator when the vehicular device has a power connector as shown in FIG. 4. FIG. 5 shows the effects which occur when the engine is started and stopped. The FIG. 5 shows powering on the device by pushing the alert button and thus activating the voice memory module versus not pushing the alert since no child or pet is in the vehicle. FIG. 5 presents no particular embodiment as to where on the device the alert button is located. Nor does FIG. 5 represent any design of the vehicular alert system per se.

Figure 6B:
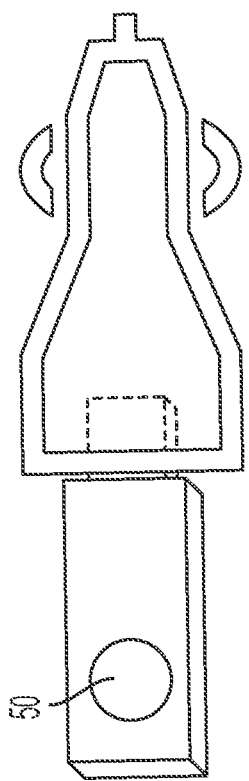
FIG. 6A shows a vehicular device wherein the power connector is a USB component having an end as male connector and FIG. 6B shows connection of the male USB component into the female end of an adapter connected, in turn, into the power source receptacle of the vehicle.
Figure 6A:
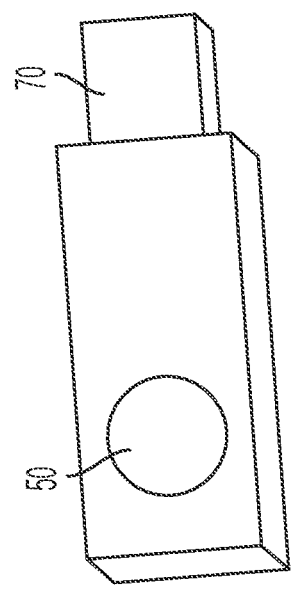

FIG. 6(A) shows a vehicular device wherein the power connector is a USB male connector 70. FIG. 6(A) is a top view of power connector. While 6(A) shows alert button 50 on the .casing of a device, the power connector having the USB male connector may be connected to the casing by any other means. FIG. 6(A) merely shows an exemplary connection of the power connector having USB male connector. FIG. 6(B) exemplifies how the male connector of the USB power connector may be attached to the power source receptacle of the vehicle. As illustrated, male connector 70 may be attached into a female end of an adapter which may then be connected into the power source receptacle in the vehicle. In another embodiment, male connector 70 may be connected to the engine by a USB receptor port in the vehicle.

Figure 7:
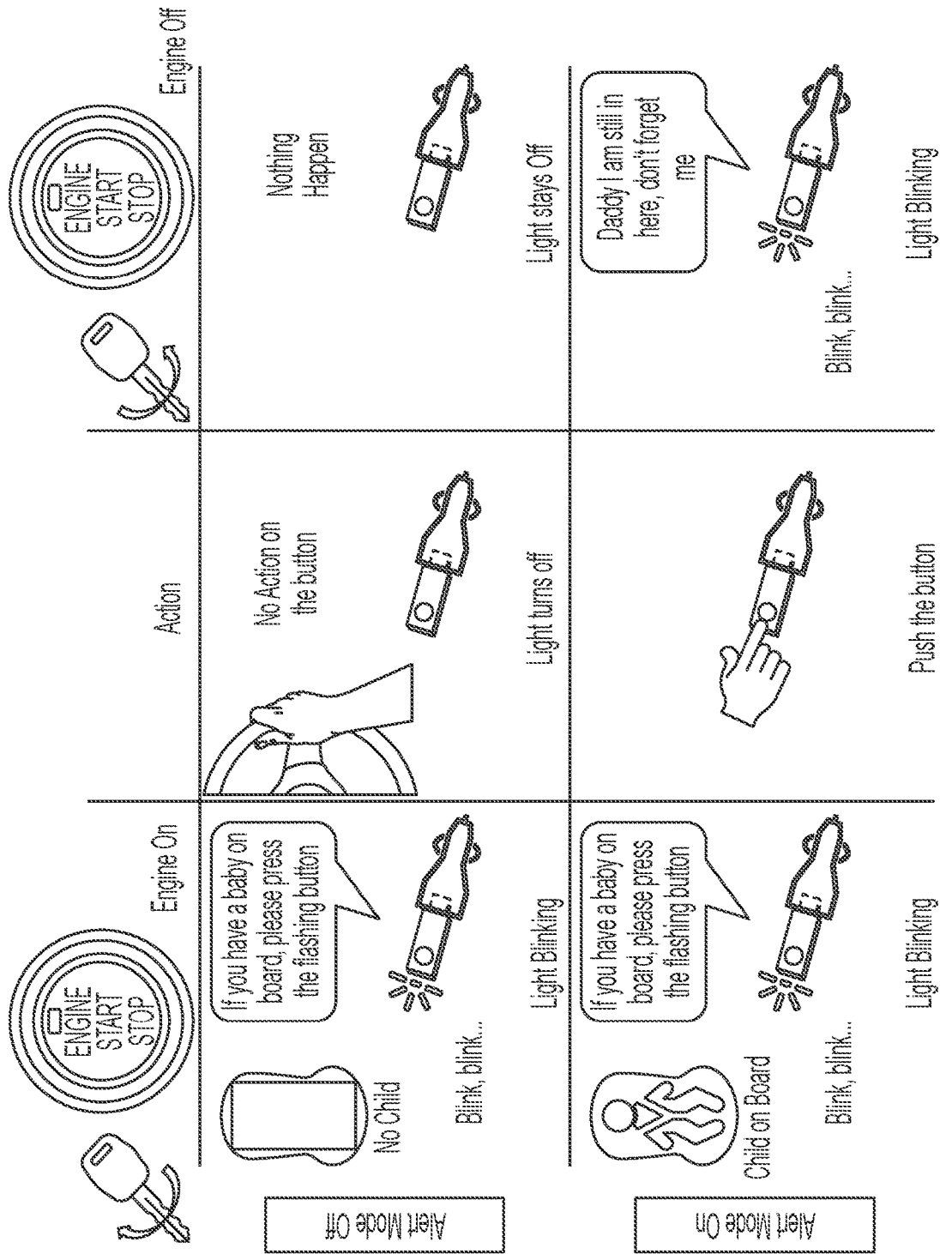
FIG. 7 illustrates the commands received by the operator and the visuals observed by the operator when the vehicular device having a power connector as shown in FIG. 6A is connected to the power source receptacle of the vehicle.

FIG. 7 illustrates the commands received by the operator and the visuals observed by the operator when the vehicular device has a power connector as shown in FIG. 6(A). FIG. 7 shows powering on the device by pushing the alert button and thus activating the first voice memory module versus not pushing the alert since no child or pet is in the vehicle. FIG. 7 presents no particular embodiment as to where on the device the alert button is located. Nor does FIG. 7 represent any design of the vehicular alert system per se. The statements shown in FIG. 7 from the voice memory module that "If you have a baby on board, please press the flashing button" and second voice memory module that "Daddy I am still in here, don't forget me" are merely exemplary. Statements may be modified by known computer programming.

Figure 8:
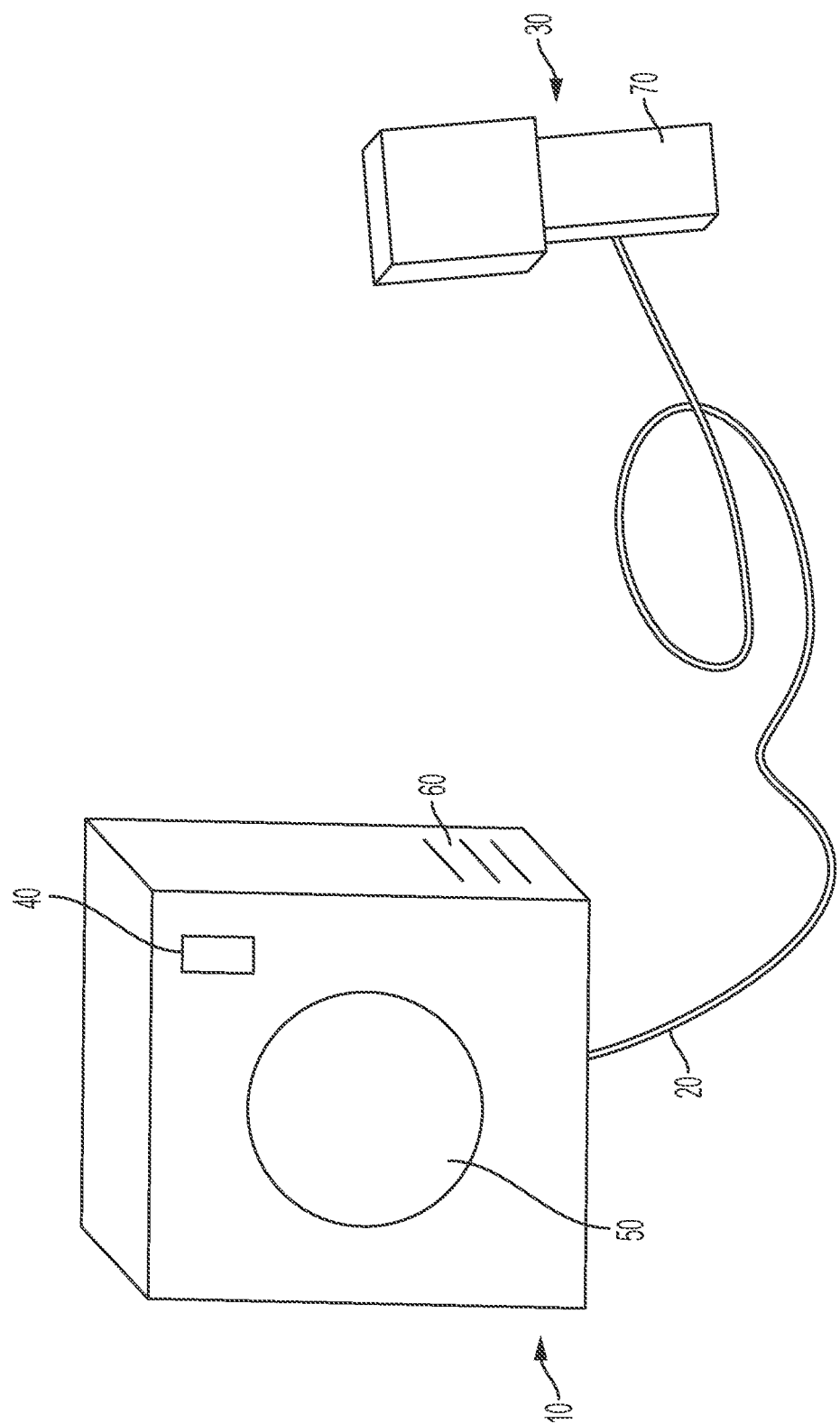
FIG. 8 represents an alternative embodiment of a vehicular device disclosed herein wherein the power connector is a USB component.

FIG. 8 is an embodiment showing the side view of a vehicular device having flat surface (here in the shape of a box) having alert button 50 and power indicator 40 on the face of casing 10 and wherein casing 10 is connected by wire cable 20 to power connector 30. Speaker grill 60 appears on the side of the unit. As shown, power connector 30 is in the form of a USB connector wherein the male end 70 of the USB connector is attached (directly or indirectly) into the power source receptacle of the vehicle. FIG. 6(B) shows connection of a USB connector into the female end of an adapter. In another embodiment, male connector 70 may be connected to the USB receptor port in the vehicle.

Figure 9:
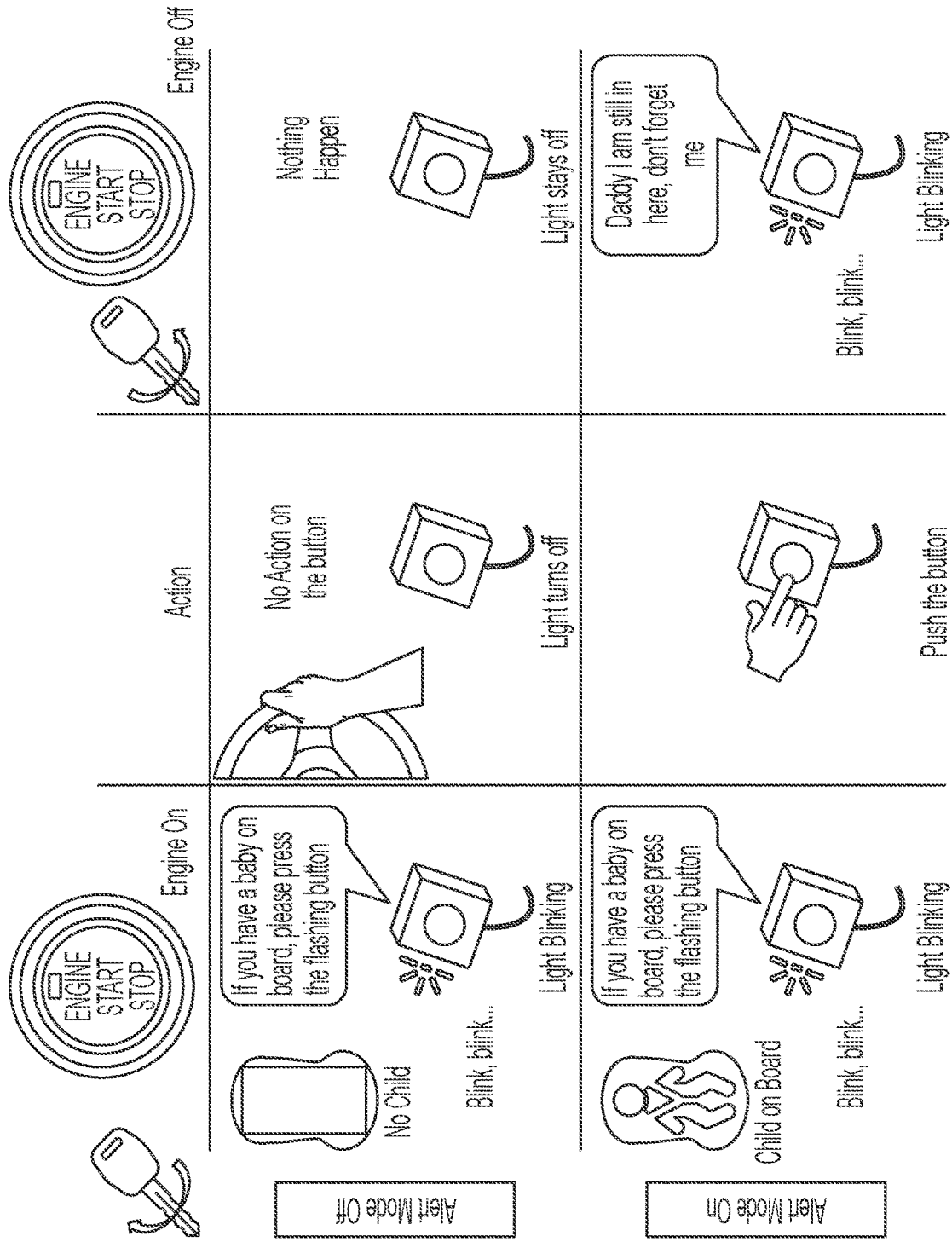
FIG. 9 illustrates the commands received by the operator and the visuals observed by the operator when the vehicular device having a power connector as shown in FIG. 8 is connected to the power source receptacle of the vehicle.

FIG. 9 illustrates the commands received by the operator and the visuals observed by the operator when the vehicular device has a power connector as shown in FIG. 6(B). FIG. 9 shows powering on the device by pushing the alert button and thus activating the voice memory module versus not pushing the alert since no child or pet is in the vehicle. FIG. 9 presents no particular embodiment as to where on the device the alert button, power indicator or speaker grill is located. Nor does FIG. 9 represent any design of the vehicular alert system per se.

FIGS. 10(A), 10(B), 10(C) and 10(D) are lateral, right side, top and left side views, respectively, of the casing of another exemplary device. Casing 10 is shown as having top 12 and bottom 14. Top 12 is shown as having greater circumference and larger diameter than bottom 14. This arrangement may provide greater ease to the operator of securing the device to the power port of the vehicle while providing greater visibility to the operator of the features of the device while driving. Casing 10 may be a single component wherein top 12 and bottom 14 form a single casing structure. Alternatively, bottom 14 may represent the power connector such that top 12 and bottom 14 are two separate pieces mechanically attached to each other, such as by complementary threads. Attachment of the vehicle device into the power source receptacle of the vehicle is shown in FIG. 11. FIGS. 10(A), 10(B) and 10(D) show the bottom-most portion of power connector 30 as having attachment 80 for securing power connector 30 of casing 10 to the power source receptacle of the vehicle. In an embodiment, power connector 30 mimics the size and shape of a cigarette lighter. Alternative power connector 100 may be, for instance, for a 12 volt may be located on casing 10 as well. Casing 10 is shown as having one or more active indicators 40(A), 40(B), 40(C), etc., speaker grill 60, alert button 50 and battery indicator 40.

FIG. 6(A) is further illustrative of a vehicular device wherein the casing is a unitary component containing the power connector (pictured as USB male connector 70). In addition to alert button, the casing may include components not shown such as an active power indicator light, speaker grill, battery indicator, etc.

FIGS. 12(A), 12(B) and 12(C) show the right side, top and left sides of an alternative vehicular device. FIG. 12(B) shows alert button 50 and active power indicator 40 being flush or nearly level with the top surface. Either alert button 50 or active powder indicator 40 may be designed to flash intermittently during use. The sides of the casing may further contain retractable guides 110 to more easily insert power connector 30 into the power source receptacle of the vehicle. The casing surface may further contain one or more USB receptacle ports for charging of other devices, such as mobile phones, et.

The casing of the vehicular safety device may be composed of any durable material capable of holding the elements of the device, particularly the operating circuits, power detection module, two voice memory modules, pulse inverter module, battery, and speaker. Preferably, the device is made of metal or plastic.

In an embodiment, the casing may be from about 4 to about 12 inches in length, from about 1 to about 4 inches in height and from about 1 to about 4 inches in width. In one embodiment, the casing is about 6 inches x about 3 inches x about 3 inches.

Embodiment 1: A vehicular child or pet safety device having (a) a power detection module capable of detecting the start or running of an engine in a motorized vehicle; (b) a first voice memory module capable of providing a query to the operator of the motorized vehicle if a child or pet is in the motorized vehicle; (c) a pulse inverter module for capable of detecting stopping of the engine; (d) a second memory module capable of providing to the operator a reminder message of the presence of a child or pet in the motorized vehicle; (e) a battery module capable of providing power to the safety device; and (f) at least one speaker capable of providing an audio interface to the operator.

Embodiment 2: The vehicular child or pet safety device of embodiment 1, wherein each of (a) to (f) are within a casing.

Embodiment 3. The vehicular child or pet safety device of embodiment 2, wherein the casing is composed of plastic and/or metal.

Embodiment 4. The vehicular child or pet safety device of any of embodiments 2 to 3, wherein the casing has one or more power sources for connecting the vehicular child or pet safety device to a power source receptacle within the motorized vehicle.

Embodiment 5. The vehicular child or pet safety device of embodiment 4, further comprising a flexible wire extending from the casing to the power source.

Embodiment 6. The vehicular child or pet safety device of embodiment 4, wherein the power source is a USB male connector.

Embodiment 7. The vehicular child or pet safety device of embodiment 6, wherein the power source further comprises USB male connector attached to the female receptor connector on an adapter.

Embodiment 8. The vehicular child or pet safety device of embodiment 6 or 7, wherein the USB male connector is capable of connecting directly to a USB receptor port in the motorized vehicle.

Embodiment 9. The vehicular child or pet safety device of any of embodiments 2 to 4, wherein the casing is a unitary component containing the one more power sources.

Embodiment 10. The vehicular child or pet safety device of any of embodiments 2 to 4, wherein the casing contains a first portion and a power source as a second portion and wherein the first portion and second portion are mechanically connected.

Embodiment 11. The vehicular child or pet safety device of any of embodiments 2 to 10, wherein the surface of the casing has an alert indicator for notifying the first voice memory module of a child or pet in the motorized vehicle.

Embodiment 12. The vehicular child or pet safety device of any of embodiments 2 to 11, wherein the casing further comprises an indicator light capable of notifying the operator of the motorized vehicle of connection with the engine of the motorized vehicle.

Embodiment 13. The vehicular child or pet safety device of any of embodiments 2 to 12, wherein the casing further comprises one or more speakers.

Embodiment 14. The vehicular child or pet safety device of any of embodiments 2 to 13, wherein the casing further comprises one or more USB receptacle ports.

Embodiment 15. The vehicular child or pet safety device of any of embodiments 2 to 10, wherein the surface of the casing has an alert indicator for notifying the first voice memory module of a child or pet in the motorized vehicle, an indicator light capable of notifying the operator of the motorized vehicle of connection with the engine of the motorized vehicle and one or more speakers.

Embodiment 16. The vehicular child or pet safety device of embodiment claims 2 to 15, wherein the casing further comprises one or more USB receptacle.

Embodiment 17. The vehicular child or pet safety device of any of claims 1 to 16, wherein the casing is from 4 to 12 inches in length, from 1 to 4 inches in height and from 1 to 4 inches in width.

Embodiment 18. A method for notifying an operator of a motorized vehicle of a child or pet in the motorized vehicle after the engine of the motorized vehicle has been shut down, the method comprising:
 (a) installing the vehicle child or pet safety device of any of claims 1 to 17 in a power source of the motorized vehicle;
 (b) starting the engine of the motorized vehicle;
 (c) notifying the operator of the motorized vehicle through the first voice memory module of the child or pet within the motorized vehicle;
 (d) stopping the engine of the motorized vehicle;
 (e) notifying the operator of the motorized vehicle through the second memory module of the child or pet in the motorized vehicle.

What is claimed is:

1. A vehicular child or pet safety device comprising:
 (a) a power detection module capable of detecting the start of an engine in a motorized vehicle;
 (b) a first voice memory module capable of providing a query to the operator of the motorized vehicle if a child or pet is in the motorized vehicle;

(c) a second voice memory module capable of providing to the operator a reminder message of the presence of a child or pet in the motorized vehicle;
(d) a single alert indicator in communication with the first voice memory module, wherein:
  (i) when activated, the single alert indicator notifies the device of the presence of a child or pet in the motorized vehicle; and
  (ii) when not activated, the single alert indicator shuts down the device;
(e) battery module capable of activating the second voice memory module when the engine is turned off;
(f) a pulse inverter module capable of detecting stopping of the engine if the single alert indicator has been activated, the pulse inverter module being in communication with the first voice memory module and the second voice memory module; and
(g) at least one speaker capable of providing an audio interface to the operator.

2. The vehicular child or pet safety device of claim 1, wherein all of (a) through (g) are in a casing.

3. The vehicular child or pet safety device of claim 2, wherein the casing has one or more power connectors for attaching the vehicular child or pet safety device to a power source receptacle within the motorized vehicle.

4. The vehicular child or pet device of claim 1, further comprising a flexible wire extending from the casing to a power connector for attaching the vehicular child or pet safety device to a power source within the motorized vehicle.

5. The vehicular child or pet device of claim 3, wherein the power connector is a USB male connector.

6. The vehicle child or pet device of claim 5, wherein the power connector further comprises the USB male connector attached to a female power receptacle on an adapter and wherein the adapter is capable of connecting to a power source receptacle in the motorized vehicle.

7. The vehicular child or pet safety device of claim 1, wherein the casing further comprises an indicator light capable of notifying the operator of the motorized vehicle of a child or pet in the motorized vehicle.

8. The vehicular child or pet safety device of claim 2, wherein the casing is from about 4 to about 12 inches in length, from about 1 to about 4 inches in height and from about 1 to about 4 inches in width.

9. The vehicular child or pet safety device of claim 2, wherein the casing is composed of two pieces mechanically connected to each other and further wherein the bottom portion has a power connector.

10. A vehicular child or pet safety device comprising:
(a) a power detection module capable of detecting the start of an engine in a motorized vehicle;
(b) an alert indicator in communication with the first audible memory module for sending notification of the presence of a child or pet in the motorized vehicle to the first audible memory module;
(c) a first voice memory module in communication with the power detection module, the first audible memory module being capable of requesting activation of the alert indicator to establish the presence of child or pet in the motorized vehicle;
(d) a pulse inverter module in communication with the first audible memory module, the pulse inverter module being capable of detecting the engine being turned off if the device has been notified of the presence of a child or pet in the motorized vehicle from the alert indicator;
(e) a second voice memory module in communication with the pulse inverter module, the second voice memory module being capable of providing the operator with a voice reminder of the presence of a child or pet in the motorized vehicle provided the operator has been notified of the presence of a child or pet in the motorized vehicle by the alert indicator;
(f) an alert indicator capable of notifying the operator of the motorized vehicle of a child or pet in the vehicle;
(g) a speaker module for receiving communication from the first voice memory module and the second voice memory module;
(h) an audio interface through the speaker module for sending communication from the first voice memory module and the second voice memory module to the operator; and
(i) a battery module capable of providing power to the vehicular child or pet safety device after the engine is turned off to activate the second voice memory module provided the alert indicator notifies the operator of the presence of a child or pet in the motorized vehicle.

11. The vehicular child or pet safety device of claim 10, wherein the power detection module, first voice memory module, second voice memory module, pulse inverter module and speaker are within a casing.

12. The vehicular child or pet safety device of claim 10, wherein all of (a) to (i) are within a casing.

13. The vehicular child or pet safety device of claim 10, wherein the casing is from about 4 to about 12 inches in length, from about 1 to about 4 inches in height and from about 1 to about 4 inches in width.

14. The vehicular child or pet safety device of claim 10, further comprising one or more power connectors for attaching the vehicular child or pet safety device to a power source receptacle within the motorized vehicle.

15. The vehicular child or pet device of claim 10, further comprising a flexible wire extending from the casing to a power connector for attaching the vehicular child or pet safety device to a power source within the motorized vehicle.

16. The vehicular child or pet safety device of claim 12, wherein the surface of the casing has an indicator light capable of notifying the operator of the motorized vehicle of a child or pet in the motorized vehicle.

17. A vehicular child or pet safety device comprising:
(a) a power detection module having a power port, the power detection module being capable of detecting the start of an engine in a motorized vehicle;
(b) a first voice memory module in communication with the power detection module, the first voice memory module sending capable of requesting the operator to notify the device of the presence of child or pet in the motorized vehicle;
(c) an alert indicator in communication with the first voice memory module for sending notification of the presence of a child or pet in the motorized vehicle to the first voice memory module;
(d) an indicator light capable of notifying the operator of the presence of a child or pet in the vehicle;
(e) a pulse inverter module in communication with the first voice memory module, the pulse inverter module being capable of detecting the stopping of the engine of the motorized vehicle; and
(f) a second voice memory module in communication with the pulse inverter module, the second voice memory module being capable of providing to the operator a reminder of the presence of a child or pet in the motorized vehicle if the device has been notified of the presence of a child or pet in the motorized vehicle from the alert indicator.

18. The vehicular child or pet safety device of claim 17, wherein each of (a) through (f) are within a casing.

19. The vehicular child or pet safety device of claim 18, further comprising a flexible wire extending from the casing to a power source connector for attaching the device to a power source receptacle within the vehicle.

20. The vehicular child or pet safety device of claim 18, further comprising a battery module capable of activating the second voice memory module after the engine is turned off.

\* \* \* \* \*